United States Patent [19]

Karayannis et al.

[11] 4,184,987

[45] Jan. 22, 1980

[54] STABILIZING ADDITIVES FOR POLYOLEFINS

[75] Inventors: Nicholas M. Karayannis; Habet M. Khelghatian; John S. Skryantz, all of Naperville, Ill.

[73] Assignee: Standard Oil Company (Indiana), Chicago, Ill.

[21] Appl. No.: 901,587

[22] Filed: May 1, 1978

Related U.S. Application Data

[63] Continuation-in-part of Ser. No. 763,053, Jan. 27, 1977, abandoned, which is a continuation-in-part of Ser. No. 589,609, Jun. 23, 1975, abandoned, which is a continuation of Ser. No. 432,070, Jan. 9, 1974, abandoned.

[51] Int. Cl.$^2$ .............................................. C08K 5/52
[52] U.S. Cl. ........................... 260/23 H; 260/45.7 PH
[58] Field of Search ...... 260/23 H, 45.85 R, 45.7 PH; 526/486

[56] References Cited

U.S. PATENT DOCUMENTS

| | | | |
|---|---|---|---|
| 2,985,617 | 5/1961 | Salyer et al. | 260/45.75 R |
| 3,000,871 | 9/1961 | Engel | 528/486 |
| 3,039,993 | 6/1962 | Friedman | 260/45.7 PH |
| 3,423,347 | 1/1969 | Zawadzki et al. | 260/28.5 B |
| 4,104,247 | 8/1978 | Kato et al. | 260/45.7 |
| 4,107,136 | 8/1978 | Minagawa et al. | 260/45.95 |

FOREIGN PATENT DOCUMENTS 42-4271 2/1967 Japan

OTHER PUBLICATIONS

Encyclopedia of Polymer Science and Technology—vol. 6, pp. 275 to 286; 1967.
Crystalline Olefin Polymers—Part 1—(1965) by Raff pp. 323 to 334.

*Primary Examiner*—V. P. Hoke
*Attorney, Agent, or Firm*—Stephen L. Hensley; Arthur G. Gilkes; William T. McClain

[57] ABSTRACT

Partial esters of polyhydroxy compounds and combinations thereof with organophosphorus compounds have been found to be effective stabilizers for polyolefins made in processes wherein such polymers are not subjected to extensive removal of process produced impurities during or subsequent to the polymerization process. Combinations of polypropylene produced in a solventless polymerization process and such partial esters are particularly suitable and show substantially improved stability in the presence of additional stabilizing compounds.

26 Claims, No Drawings

STABILIZING ADDITIVES FOR POLYOLEFINS

RELATED APPLICATIONS

This application is a continuation-in-part of U.S. Pat. Application Ser. No. 763,053, filed Jan. 27, 1977, now abandoned which is a continuation-in-part of U.S. Application Ser. No. 589,609, filed June 23, 1975, now abandoned, which is a continuation of U.S. Application Ser. No. 432,070, filed Jan. 9, 1974, now abandoned.

SUMMARY OF THE INVENTION

This invention relates to compounds for stabilizing normally solid polyolefins made from terminal olefins by essentially solventless, anionically catalyzed polymerization processes wherein catalyst residues and low molecular weight and amorphous components of the polymeric product are incompletely removed from the product, and to novel compositions containing said polyolefins and said compounds. More particularly, the invention relates to partial esters of polyhydroxy compounds and combinations thereof with organophosphorus compounds and novel compositions made therefrom with normally solid polyolefins or their copolymers made as described above, such compositions demonstrating improved stability during the usual shaping operations, etc. with respect to such polyolefins without such partial esters or combinations.

In accordance with the instant invention, compounds which are the partial esters of polyhydroxyl compounds and long chain acids, particularly where said polyhydroxy compounds have two (2) or more OH groups and no additional functionality and where said long chain acids are monocarboxylic acids with eight (8) or more carbon atoms, are added in an effective amount to normally solid, high-molecular-weight, crystalline polyolefins, particularly those made by vapor phase or bulk phase processes, to stabilize such polyolefins against, inter alia, thermal degradation during shaping operations, decrease the yellowness and increase the brightness of the polyolefins and increase the clarity of films made from such polyolefins. Still further improvements in polyolefin stability are achieved through the conjoint use of such partial esters and one or more organophosphites, organothiophosphites, or organothioglycolylphosphites.

BACKGROUND OF THE INVENTION

One feature of vapor phase and bulk phase commercial polymerization techniques for preparing polyolefins with anionic catalysts is that catalyst residues and low-molecular-weight and amorphous polymers are not separated as completely (or at all) from the polymeric products prior to polymer use. Polymeric products made using a liquid preparative medium, e.g., in a slurry or solution process, are generally washed during and after the polymerization process which removes such impurities before the polymeric product is fabricated into shaped articles. The presence of catalyst residues and low-molecular-weight and amorphous products in the polymeric product creates problems in the further treatment of such polymers, e.g., molding, film making, fiber preparation, etc. Such problems include, inter alia, die smoking during film extrusion, thermal degradation during extrusion or shaping operations, yellowing, decreases in brightness, and decreased clarity in polymer films. Thus, in addition to stabiizers usually added to polyolefins made by slurry or solution polymerization techniques, other stabilizers capable of forming complexes with ionic catalyst residues and negating the effects of unseparated materials are required.

Now it has been found that by utilizing compounds which are the partial esters of low to moderate molecular weight polyhydroxy compounds containing two (2) or more hydroxy groups with long chain monocarboxylic acids wherein, preferably, one hydroxyl group has been esterified, or combinations thereof with certain organophosphite, organothiophosphite or organothioglycolylphosphite esters as stabilizers, ionic catalyst residues contained in normally solid, crystalline, high-molecular-weight polyolefins prepared by essentially solventless polymerization processes are tied up such that the deleterious effects of the catalyst residues and other incompletely removed materials, such as low molecular weight and amorphous components, are largely or completely solved.

Prior art which may be considered relevant to the present invention includes Japanese Pat. No. 4271 which is directed to the use of esters of pentaerythritol and combinations thereof with esters of glycerin as antifogging agents in polyolefins. According to the patentees, combining such materials with polyolefins result in a distribution of hydrophilic groups throughout films and other articles prepared from the polymeric compositions and these hydrophilic groups aid in distribution of water over the surfaces of the articles thereby preventing agglomeration of the water and formation of droplets. This reference does not suggest that the disclosed esters improve the stability of polyolefins during fabrication of useful articles therefrom or that the articles exhibit improved resistance to discoloration upon aging. Further, there is no suggestion that the disclosed esters from complexes with ionic catalyst residues contained in polyolefins prepared by essentially solventless polymerization processes so as to substantially prevent the catalyst residues from contributing to processing and other difficulties.

U.S. Pat. No. 3,773,716 is directed to the use of a variety of organic compounds containing P-S bonds, including trithioglycolyl phosphites, as flame retardants, antioxidants, and thermal and U.V. stabilizers for various polymers including polyolefins. It is disclosed that such compounds can be combined with additional stabilizers including organosulfur compounds such as pentaerythritol tetra(mercaptoacetate); phenolic antioxidants; epoxy compounds such as glycidyl ethers of glycerine, pentaerythritol, and sorbitol; and phosphite and thiophosphite stabilizers such as tristearyl phosphite, trilauryl phosphite, trilauryltrithiophosphite, tri(nonylphenol)phosphite, and tris-(4-methylthiophenyl) phosphite. The patentees also disclose that catalyst residues and other impurities adversely affect the thermal stability of polypropylene and other monoolefin polymers, and that polyvalent metal salts of fatty acids can be added to such polymers to impart thermal stability thereto.

STATEMENT OF THE INVENTION

Polyolefins treatable by the disclosed compounds are generally those made by solventless polymerization processes or those made using a preparative medium where little or no attempt is made to eliminate the ionic catalyst, e.g., a titanium halide and an aluminum alkyl compound, and the low-molecular-weight and amorphous polymers formed prior to polymer use. These polyolefins are normally solid, in the commercial molecular weight range and are generally highly crystalline. Such polyolefins include those made from terminal olefins containing from two (2) to about eight (8) carbon atoms, such as polybutene-1, poly 4-methylpentene-1, polypropylene and polyethylene, and copolymers thereof, and, more particularly, polypropylene, polyethylene and copolymers of propylene or ethylene with at least one other $C_2$ to about $C_8$ terminal olefin. Most particularly, polypropylene and copolymers of propylene and at least one other $C_2$ to about $C_8$ terminal olefin is used. The term copolymers includes the terminal block, pure block or multisegment types of materials.

The stabilizing compounds are, usefully, partial esters of low-molecular-weight polyhydric compounds such as:

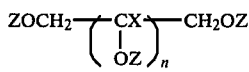 (a)

wherein X is H or lower alkyl (one (1) to three (3) carbon atoms), Z is H or COR and at least one Z is a COR radical, R is a hydrocarbyl group of from about eight (8) to about twenty (20) carbon atoms, n runs between one (1) and about four (4):

 (b)

wherein m runs between one (1) and three (3) and Z and R are as defined herein in (a):

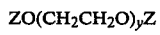 (c)

wherein y runs between one (1) and about one hundred (100) and Z is as defined in (a).

More preferably, the stabilizers contain only a single Z group, with R as above defined and, most preferably, the stabilizing compound is a monostearate, monolaurate, monopalmitate or monooleate ester of polyethylene glycol, glycerol trimethylolpropane, pentaerythritol or sorbitol.

Such compounds may be made by conventional techniques such as esterification of polyalcohols with monocarboxylic acids, etc.

The above-described compounds are employed alone, or preferably, in combination with at least one organophosphorus compound of the formula $P(AR')_3$, wherein A is —O—, —S—, or —SCH$_2$COO—, R' is hydrogen or a hydrocarbyl radical selected from the group consisting of aryl, alkylaryl, and aliphatic groups containing from about 8 to about 20 carbon atoms, at least one R' being a hydrocarbyl radical. Exemplary of organophosphorus compounds of the above formula include phosphites, mono-, di-, and trithiophosphites, and mono-, di-, and trithioglycolyl phosphites containing one or more of the following hydrocarbyl R' radicals: phenyl, octylphenyl, isooctylphenyl, nonylphenyl, decylphenyl, ethylhexyl, octyl, isooctyl, nonyl, decyl, isodecyl, lauryl, palmityl, stearyl, and oleyl. Preferably, the organophosphorus compound is a phosphite, thiophosphite, or thioglycolyl phosphite containing three hydrocarbyl radicals which radicals may be the same or different. Particularly preferred trihydrocarbylphosphites are phenyl didecyl phosphite, diphenyl isodecyl phosphite, and diphenyl isooctyl phosphite, the latter being most preferred. Particularly preferred trihydrocarbyl thiophosphites are the trihydrocarbyl trithiophosphites, and particularly trilauryl trithiophosphite.

Particularly preferred trihydrocarbyl thioglycolylphosphites are the trihydrocarbyl trithioglycolyphosphites and especially triisooctyl trithioglycolyphosphite.

Phosphites, thiophosphites, and thioglycolylphosphites which are useful according to this invention can be prepared by reacting phosphorus trichloride with alcohols, thiols, and compounds of the formula HSCH$_2$COOR' wherein R' is as described above. The reaction is typically carried out in the presence of a tertiary base, such as pyridine or a dialkylaniline, when a trialkylphosphite or trialkyl trithiophosphite is to be prepared. Further details with respect to the preparation of these compounds can be found in Kosolapoff, *Organophosphorus Compounds*, pages 180–192, John Wiley & Sons, Inc. (1950); Van Wazer, *Phosphorus And Its Compounds*, Vol. I, pages 371–374 and 824–826, Interscience Publishers, Inc. (1966); Rattenbury, U.S. Pat. No. 3,773,716; and Myers, U.S. Pat. No. 3,374,291, all of which are incorporated herein by reference.

The above described materials are intimately mixed with the polyolefin in an amount effective to increase the whiteness and brightness of the polyolefin and decrease its tendency to thermally degrade during shaping operations. Effective amounts of partially esterified polyhydroxyl compounds generally range from about one hundredth (0.01) weight percent to about one (1) weight percent based on the total weight present. More preferably, the amount of this compound used runs between about five hundredths (0.05) and about five tenths (0.5) weight percent of the total weight. An effective amount of organophosphorus additive generally ranges from about 0.01 to about 1 percent, by weight, of the total composition. Preferred organophosphorus compound concentrations range from about 0.05 to about 0.5 weight percent. The amount of organophosphorus additive employed is preferably less than the amount of partially esterified polyhydroxyl compound utilized. What is an effective amount generally depends upon the amount of the ionic catalyst residue present in the polymeric product and, perhaps, the amount of accompanying amorphous and low-molecular-weight polymer as well. These impurities in turn depend upon the catalyst yield and the catalyst's ability to produce high molecular weight, crystalline product. Current catalysts used in solventless processes have catalyst yields requiring the above stated ranges. More effective catalysts could require less stabilizing compound than hereinabove described. Obviously, for economic and other reasons, it is desired to keep the amount of stabilizer to about the threshold effective amount and not load the stabilized polyolefin with material which may itself degrade the polymeric product when present in large amounts.

The stabilizers are introduced, generally in finely divided form into the polyolefin in ways conventional to the stabilizer art and are well known to those skilled in this art. Such methods include dry blending of polymer and stabilizer powders, extrusion of a mix of stabilizing compound with powdered or granular polyolefin, etc.

It is contemplated that such stabilizers as are herein disclosed may be used alone, or, in the preferred mode, in conjunction with other additives and combinations of additives. Such additives include alkaline materials like calcium hydroxide, ultraviolet stabilizers and additional oxidation and thermal stabilizers. Representative of the last two groups are Argus Mark OTM, Thermolite 813, Goodrite 3114, and Irganox, DSTDP and B.H.T. and the like.

While the invention is described in connections with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

Yellowness and brightness determinations were made using ASTM test No. D-1928. Melt flow rate determinations were made using ASTM test No. D-1238 (Cond. G).

Oven stability at 300° F. or 320° F. is conducted on injected molded discs of 2¼ inch diameter and ⅛ inch thickness which discs are made using a mini injection molder operated at 465° F. Failure of a disc is given in hours at the point where ten (10) percent of the surface of the test disc shows substantial darkening and powdering.

The multi extrusion test is made by extruding the compositions at 550° F. Repelletizing is accomplished by using a half (0.5) inch, single stage screw compounding extruder.

Spiral flow is measured in a plunger injection molding machine and the effects of changes in cylinder temperature and injection pressure upon flow are measured as inches of flow in a spiral flow mold. Increases in inches of flow are indicative of increased degradation of the tested polymer.

In the above tests the polyolefin powder is mixed with the stabilizing compounds in an electric blender. The mix is then extruded, pelletized and subsequently injection molded into plaques for the yellowness, brightness and oven stability tests. The mix is extruded at 420° F. and pelletized for the melt flow rate and spiral flow tests.

Jonwax-12 is pentaerythritol monostearate and is a Trade Mark of S. C. Johnson & Sons, Inc., Racine, Wisconsin. PMO, PMS and PDS are pentaerythritol monooleate, pentaerythritol monostearate and pentaerythritol distearate, respectively. Emsorb and Emerest are Trade Marks of Emery Industries, Inc. and cover esters of sorbitol and polyethylene glycol.

Advastab CH-90 is a Trade Mark of Cincinnati Milacron Chemicals, Inc. and is isooctyldiphenylphosphite. Argus Mark OTM is a Trade Mark of the Argus Chemical Corp., Brooklyn, N.Y. and is di-n-octyltin S,S'-bis-(isooctylmercaptoacetate). TMP is trimethylolpropane. Thermolite 813 is a Trade Mark of M & T Chemicals, Inc., Rahway, N.J. and is di-n-octyltin maleate. Weston 618 is a Trade Mark of Weston Chemicals, Inc., a division of Borg-Warner Corp., and is cyclic neopentanetetrayl bis(octadecyl phosphite). Goodrite 3114 is a Trade Mark of the B. F. Goodrich Corp. and is 1,3,5-tris(3,5-di-t-butyl-4-hydroxytolyl) isocyanurate. B.H.T. is 3,5-di-t-butyl-4-hydroxytoluene. Calcium stearate is stabilizer grade material which is purchasable generally. Polygard is tris(nonlphenyl) phosphite and is a Trade Mark of National Polychemicals: Uniroyal Chemical Division of Uniroyal, Inc. Irganox 1076 is octadecyl 3,5-ditertiary butyl-4-hydroxyhydrocinnamate and is a Trade Mark of Ciba-Geigy Corp. DSTDP is distearylthiodipropionate. A, B, C and D are mixtures of stabilizing substances chosen from the above and are proprietary formulations of Amoco Chemicals Corporation. All percentages in the Examples below are weight percents.

EXAMPLE I

Yellowness and brightness tests were made using a number of compositions containing bulk phase polypropylene and 0.25 weight percent of one of the disclosed additives. Additionally, 0.15 weight percent Polygard (tris-(nonylphenyl) phosphite), 0.05 weight percent Argus Mark OTM, 0.05 weight percent of Ca(OH)$_2$ and 0.55 weight percent of stabilizer system A were added to the composition.

| Additive | Yellowness (percent) | Brightness (percent) |
| --- | --- | --- |
| Jonwax-12 | 6.6 | 66.1 |
| PMO | 6.6 | 65.9 |
| Sorbitan Monooleate (Emsorb 2500) | 7.0 | 66.0 |
| Sorbitan Monolaurate (Emsorb 2515) | 6.8 | 66.0 |
| Sorbitan Monopalmitate (Emsorb 2510) | 9.3 | 65.9 |
| Sorbitan Monostearate (Emsorb 2505) | 8.1 | 65.7 |
| POE (20) Sorbitan Monooleate (Emsorb 6900) | 8.4 | 65.8 |
| POE (20) Sorbitan Monolaurate (Emsorb 6915) | 8.2 | 65.6 |
| POE (20) Sorbitan Monopalmitate (Emsorb 6910) | 7.1 | 66.1 |
| POE (20) Sorbitan Monostearate (Emsorb 6905) | 7.6 | 65.9 |
| PEG 400 Monostearate (Emerest 2640) | 6.7 | 66.4 |
| PEG 400 Monolaurate (Emerest 2650) | 6.0 | 66.6 |
| PEG 600 Monooleate (Emerest 2660) | 6.7 | 66.2 |

EXAMPLE II

The effect of concentration of the disclosed additives and mixtures thereof on the yellowness and brightness of compositions using bulk phase polypropylene was investigated using the same levels of Polygard, Ca(OH)$_2$ and stabilizer system A as EXAMPLE I.

| Additive | Yellowness (percent) | Brightness (percent) |
| --- | --- | --- |
| 0.25% Jonwax-12 | 7.0 | 65.4 |
| 0.35% Jonwax-12 | 6.9 | 65.8 |
| 0.5% Jonwax-12 | 7.1 | 65.8 |
| 0.25% PMO | 7.7 | 65.7 |
| 0.35% PMO | 7.1 | 65.8 |
| 0.5% PMO | 7.5 | 65.9 |
| 0.25% Jonwax-12 + 0.05% PMO | 8.3 | 64.7 |
| 0.25% Jonwax-12 + 0.15% PMO | 8.6 | 65.2 |
| 0.025% Jonwax-12 + 0.05% TMP | 7.7 | 65.8 |
| 0.25% PMO + 0.05% TMP | 7.4 | 65.7 |
| 0.25% Jonwax-12 + 0.05% OTM | 6.6 | 66.1 |
| 0.25% Jonwax-12 + 0.04% OTM | 6.6 | 65.9 |
| 0.25% Jonwax-12 + 0.025% OTM | 6.2 | 66.3 |
| 0.2% Jonwax-12 + 0.05% OTM | 6.6 | 65.9 |
| 0.2% Jonwax-12 + 0.04% OTM | 6.3 | 66.1 |
| 0.25% PMO + 0.05% OTM | 6.6 | 65.9 |
| 0.25% PMO + 0.04% OTM | 6.8 | 66.1 |
| 0.25% PMO + 0.025% OTM | 6.3 | 66.4 |
| 0.2% PMO + 0.05% OTM | 7.0 | 65.8 |
| 0.2% PMO + 0.04% OTM | 6.7 | 65.9 |

EXAMPLE III

Yellowness and brightness tests were made using a number of compositions containing bulk phase polypropylene and 0.25 weight percent of one of the disclosed additives. Additionally, 0.05 weight percent Thermolite 813, 0.05 weight percent Ca(OH)$_2$ and 0.4 weight percent of stabilizer system C were added to each tested composition except the last.

| Additive | Yellowness (percent) | Brightness (percent) |
|---|---|---|
| Jonwax-12 | 6.6 | 66.1 |
| Diglycerol monooleate | 6.1 | 65.7 |
| Glycerol monostearate | 6.7 | 65.2 |
| Glycerol monooleate | 6.6 | 65.5 |
| PMS* | 2-2.5 | 66-67 |

*Contained besides PMS: 0.05% Ca(OH)₂; and 0.9 weight percent of stabilizer system D.

EXAMPLE IV

Oven stability and yellowness prior to failure at 300° F. of compositions containing various amounts of the disclosed stabilizers and bulk phase polypropylene are shown below. Each tested composition contained additionally 0.15 weight percent Polygard (tris(nonylphenyl) phosphite), 0.05 weight percent of Ca(OH)₂ and 0.55 weight percent of stabilizer system A.

| Additive | Yellowness Prior to Failure (percent) | Hours to Failure (two discs) |
|---|---|---|
| 0.25% Jonwax-12 + 0.05% Thermolite 813 | 47.2 | 1875,2043 |
| 0.25% Jonwax-12 + 0.05% OTM | 46.5 | 2225,2091 |
| 0.25% PDS + 0.05% Thermolite 318 | 43.4 | 2091,2043 |
| 0.25% PDS + 0.5% OTM | 48.1 | 2225,2139 |
| 0.25% Jonwax-12 | 41.2 | 1488,1440 |
| 0.35% Jonwax-12 | 41.6 | 1488,1440 |
| 0.5% Jonwax-12 | 43.2 | 1464,1440 |
| 0.25% pentaerythritol monooleate | 47.3 | 1464,1440 |
| 0.35% pentaerythritol monooleate | 50.9 | 1440,1368 |
| 0.5% pentaerythritol monooleate | 49.2 | 846,870 |
| 0.25% Jonwax-12 + 0.05% OTM | 43.7 | 1724,1724 |
| 0.25% Jonwax-12 + 0.04% OTM | 42.2 | 1800,1632 |
| 0.25% pentaerythritol monooleate + 0.05% OTM | 42.5 | 1488,1536 |
| 0.25% pentaerythritol monooleate + 0.05% OTM | 46.8 | 1536,1585 |
| 0.25% sorbitan monooleate + 0.05% OTM | 47.9 | 1560,1776 |
| 0.25% sorbitan monolaurate + 0.05% OTM | 40.5 | 1608,1656 |
| 0.25% PEG 600 monooleate + 0.05% OTM | 54.0 | 846,702 |
| 0.25% POE (20) monopalmitate + 0.05% OTM | 57.6 | 870,870 |
| 0.25% PEG 400 monolaurate + 0.05% OTM | 41.5 | 846,1440 |
| 0.25% PEG 400 monostearate + 0.05% OTM | 40.4 | 1440,1536 |

EXAMPLE V

As an additional means of studying the thermal degradation of polyolefins stabilized with the disclosed additives, compositions of bulk phase polypropylene and one or more of the disclosed stabilizers were subjected to repeated heated extrusions. The compositions used contained additional stabilizers as is designated below. The amounts of the disclosed and additional stabilizers used in weight percent were as follows: Jonwax-12 and PDS, 0.25; Argus Mark OTM, Thermolite 813, Advastab CH-90 (isooctyl diphenyl phosphite), and Ca(OH)₂, 0.05; Polygard (tris-(nonylphenyl) phosphite), 0.15; stabilizer system C, 0.95; stabilizer system A, 0.55. Melt flow rates were determined after each extrusion to study the rate of degradation as a function of this type of processing.

Comparison of Samples 4 and 5 illustrates that in otherwise identical compositions, Jonwax-12 (pentaerythritol monostearate) imparts superior thermal stability and resistance to degradation to bulk phase polypropylene as compared with conventional organotin stabilizers such as Argus Mark OTM (di-n-octyltin-S,S'-bis-(isooctylmercaptoacetate). Comparison of Samples 4 and 10 shows that still further improvements were achieved through the use of Jonwax-12 in combination with Advastab CH-90 (diphenyl isooctyl phosphite).

| Sample | Additive | Number of Extrusion at 550° F. | | |
|---|---|---|---|---|
| | | 1 | 2 | 3 |
| | | Melt Flow Rates* | | |
| (1) | Jonwax-12 + OTM + Ca(OH)₂ + st. syst. B. | 3.5 | 6.5 | 10.5 |
| (2) | Jonwax-12 + OTM + Ca(OH)₂ + st. syst. C | 4.7 | 18.6 | 25.0 |
| (3) | Jonwax-12 + OTM + Ca(OH)₂ +OTM st. syst. B*** | | 10.3 | 11.2 |
| (4) | Jonwax-12 + Ca(OH)₂ + st. syst. B | | 2.2 | 2.8 |
| (5) | OTM + Ca(OH)₂ + st. syst. B | | 3.0 | 3.8 |
| (6) | Ca(OH)₂ + st. syst. B | | 1.6 | 2.0 |
| (7) | Jonwax-12 + T-813 + Ca(OH)₂ + st. syst. B | 1.9 | 3.8 | 5.1 |
| (8) | Jonwax-12 + T-813 + Ca(OH)₂ + st. syst. C | 2.4 | 5.4 | 9.4 |
| (9) | T-813 + Ca(OH)₂ + st. syst. B | | 2.1 | 2.6 |
| (10) | Jonwax-12 + A-CH90 + Ca(OH)₂ + st. syst. B | 1.4 | 1.9 | 2.7 |
| (11) | A-CH90 + Ca(OH)₂ + st. syst. B | | 1.9 | 2.2 |
| (12) | Jonwax-12 + Polygard + OTM + Ca(OH)₂ + st. syst. A | 10.2 | 19.8 | 32.5 |
| (13) | Jonwax-12 + Polygard + OTM + Ca(OH)₂ + st. syst. A*** | 11.1 | 16.3 | 18.9 |
| (14) | T-813 + Jonwax-12 + Polygard + Ca(OH)₂ + st. syst. A | | 4.7 | 8.2 |
| (15) | PDS + 1OTM + Ca(OH)₂ + st. syst. C | 5.4 | 9.1 | 10.2 |
| (16) | PDS (St acid)** + OTM + Ca(OH)₂ + st. syst. C | 5.3 | 7.9 | 10.3 |

*Values of the melt flow rates are given in grams per ten minutes
**PDS containing four (4) percent stearic acid
***Polypropylene used was made in a slurry process
st. syst. = stabilizer system

EXAMPLE VI

Oven stability at 320° F. of compositions containing various amounts of the disclosed stabilizers and bulk phase of polypropylene are shown below. The compositions contain additional stabilizers as indicated. Amounts of the various stabilizers added are given in weight percent.

| Additive | Hours to Failure (two discs) |
|---|---|
| 0.25% Jonwax-12 + 0.15% Polygard + 0.05% OTM + 0.05% Ca(OH)$_2$ + 0.55% st. syst. A | 787,787 |
| 0.25% Jonwax-12 + 0.15% Polygard + 0.05% Ca(OH)$_2$ + 0.55% st. syst. A | 736,736** 810,810 |
| 0.25% Jonwax-12 + 0.15% Polygard + 0.05% OTM + 0.075% Ca(OH)$_2$ + 0.55% st. syst. A | 867,867 |
| 0.25% Jonwax-12 + 0.15% Polygard + 0.075% Ca(OH)$_2$ + 0.55% st. syst. A | 736,835 |
| 0.25% Jonwax-12 + 0.15% Polygard + 0.05% OTM + 0.05% Ca(OH)$_2$ + 0.55% st. syst. A | 627,787 |
| 0.25% Jonwax-12 + 0.15% Polygard + 0.05% Ca(OH)$_2$ + 0.55% st. syst. A | 736,811 |
| 0.25% Jonwax-12 + 0.05% OTM + 0.05% Ca(OH)$_2$ + 0.325% st. syst. C | 138,138 |
| 0.25% Jonwax-12 + 0.15% Polygard + 0.05% OTM + 0.05% Ca(OH)$_2$ + 0.55% st. syst. A | 640,444 |
| 0.25% Jonwax-12 + 0.05 OTM + 0.05 Ca(OH)$_2$ + 0.4% st. syst. C | 30,30 |
| 0.15% Polygard + 0.05% Ca(OH)$_2$ + 0.55% st. syst. A | 763,763 |
| 0.15% Polygard + 0.55% st. syst. A* | 736,811 |
| 0.15% Polygard + 0.05% OTM + 0.55% st. syst. A* | 595,595 |
| 0.4% st. syst. C | 94,94 |

*Polypropylene used was made in a slurry process
**4 discs studied, each pair using a different batch of bulk polypropylene

COMPARATIVE EXAMPLE VII

Comparative percent yellowness, percent brightness and oven life tests were made on polypropylene powders made by a slurry process and made by bulk phase process. A substantial improvememt in yellowness, a smaller improvement in brightness and essentially no change in oven life was found for the bulk phase product when PM (pentaerythritol monostearate) was used as a stabilizer. No such improvements were found for slurry process polypropylene. See the Table below.

TABLE
COMPARISON OF THE EFFECT OF PENTAERYTHRITOL MONOSTEARATE ON THE PROPERTIES OF SLURRY AND BULK POLYPROPYLENE

| Sample | Additive Package | Percent Yellowness | Percent Brightness | Oven Life at 320° F., hr*** |
|---|---|---|---|---|
| 1. Slurry product* | 0.25% PM, 0.05% Ca(OH)$_2$, 0.7% V-4**** | 11.81 | 62.32 | 283,283,283 (283) |
| 2. Slurry product* | 0.05% Ca(OH)$_2$ 0.7% V-4 | 12.41 | 62.27 | 283,307,450 (346) |
| 3. Bulk product** | 0.25% PM, 0.05% Ca(OH)$_2$, 0.7% V-4 | 5.23 | 66.53 | 307,219,331 (286) |
| 4. Bulk product** | 0.05% Ca(OH)$_2$ 0.7% V-4 | 11.11 | 65.68 | 283,283,450 (338) |

*Slurry product made using hexane as a diluent and a catalyst composed of diethylaluminum chloride, TiCl$_3$, together with a small amount of an aromatic amine and inorganic sulphide.
** Bulk product made using a catalyst composed of diethylaluminum chloride, TiCl$_3$, and a small amount of aromatic amine and inorganic sulphide.
***Results on three plaques (average value in parentheses).
****V-4 is an additive package, composed of 21%, by weight of the package, Polygard, and other components, which is proprietary to Amoco Chemicals Corporation.

COMPARATIVE EXAMPLE VIII

Pentaerythritol monostearate (PM) alone was used as a stabilizer for bulk phase and slurry-made polypropylene in these relative brightness and yellowness index tests. The results show a larger improvement in yellowness index using PM with bulk phase polypropylene than with slurry-made polypropylene. See the Table below.

TABLE

| | Slurry PP | | | | Bulk PP | | | |
|---|---|---|---|---|---|---|---|---|
| PM Level (wt. %) | 0 | 0.1 | 0.3 | 0.9 | 0 | 0.1 | 0.3 | 0.5 |
| Yellowness Index | 6.2 | 4.3 | 4.3 | 3.9 | 9.8 | 5.9 | 5.4 | 5.6 |
| Rel. Brightness | 69.1 | 69.6 | 69.6 | 69.8 | 69.0 | 69.5 | 69.5 | 69.4 |

COMPARATIVE EXAMPLE IX

PM in conjunction with calcium stearate and Goodrite 3114 were used as a stabilizer package for bulk phase and slurry made polypropylene in these comparative oven aging tests. Yellowness index and relative brightness measurements were also made. The results are shown below in the Table.

TABLE

| | Slurry PP* | | Bulk PP*. | |
|---|---|---|---|---|
| Purity | 99.35 | 99.65 | 99.35 | 99.65 |
| Oven aging (hrs.) 300° F. | 498 | 354 | 210 | 90 |

TABLE-continued

|  | Slurry PP* | | Bulk PP* | |
|---|---|---|---|---|
| 320° F. | 42 | 42 | 18 | 18 |
| Yellowness Index | 8.3 | 11.9 | 7.9 | 9.9 |
| Rel. Brightness | 67.8 | 66.7 | 69.1 | 68.4 |

*Each test item contained 0.3% PM, 0.15% calcium stearate and 0.2% Goodrite 3114.

EXAMPLE X

Yellowness and brightness tests were made using compositions containing bulk phase polypropylene, 0.25 wt.% pentaerythritol monostearate, 0.15 wt.% BHT, 0.15 wt.% Goodrite 3114, 0.15 wt.% calcium stearate, and 0.05 wt.% calcium hydroxide. Samples 2 and 3 contained 0.05 wt.% of the additional additives identified below. Results were as follows:

| Sample | Additional Additive | Yellowness (%) | Brightness (%) |
|---|---|---|---|
| 1 | — | 6.4 | 69.7 |
| 2 | diphenyl isooctyl phosphite (Advastab CH-90) | 3.7 | 71.4 |
| 3 | di-n-octyltin-S,S'-bis-(isooctylmercaptoacetate) (Argus Mark OTM) | 4.6 | 70.1 |

This example illustrates the improvements achieved using combinations of partial esters of polyhydroxyl compounds such as pentaerythritol monostearate and organophosphites such as diphenyl isooctyl phosphite according to this invention. Comparision of Samples 2 and 3 reveals that such combinations produce superior results in terms of yellowness and brightness as compared with the use of combinations of pentaerythritol monostearate and conventional organotin stabilizers.

EXAMPLE XI

Oven stability tests were made at 320° F. using compositions containing bulk phase polypropylene, 0.25% pentaerythritol distearate, 0.05 wt.% calcium hydroxide, 0.7 wt.% stabilizer package V-4 (containing 21 wt.% Polygard which is tris-(nonylphenyl) phosphite, and an additional additive in the amounts indicated below. Results were as follows:

| Sample | Wt. % Additional Additive | Hours to Failure (two plaques) |
|---|---|---|
| 1 | 0.05 diphenyl isooctyl phosphite (Advastab CH-90) | 749,837 |
| 2 | 0.025 di-n-octyltin-S,S'-bis-(isooctylmercaptoacetate) (Argus Mark OTM) | 616,636 |
| 3 | 0.05 di-n-octyltin-S,S'-bis-(isooctylmercaptoacetate) (Argus Mark OTM) | 834,834 |

This example illustrates the improvements achieved using partial esters of polyhydroxyl compounds, such as pentaerythritol distearate, in conjunction with combinations of organophosphites (Sample 1) or combinations of an organophosphite with an organotin stabilizer (Samples 2 and 3).

EXAMPLE XII

Spiral flow tests were made at 550° F. using compositions containing bulk phase polypropylene, 0.25 wt.% pentaerythritol monostearate, 0.15 wt.% BHT, 0.15 wt.% Goodrite 3114, 0.15wt.% calcium stearate, 0.05 wt.% calcium hydroxide, and, in Samples 2-4, 0.05 wt.% of the additional additives specified below. Results were as follows:

| Sample | Additional Additive | Spiral Flow (in.) |
|---|---|---|
| 1 | — | 19.6 |
| 2 | diphenyl isooctyl phosphite (Abvastab CH-90) | 19.2 |
| 3 | di-n-octyltin-S,S'-bis-(isooctylmercaptoacetate) (Argus Mark OTM) | 25.7 |
| 4 | di-n-octyltin maleate (Thermolite 813) | 24.4 |

This example illustrates the effects of the stabilizers of this invention in retarding thermal degradation of polyolefins. Comparison of Samples 1 and 2 with Samples 3 and 4 shows that pentaerythritol monostearate alone or in combination with diphenyl isooctyl phosphite was superior to combinations of pentaerythritol monostearate with conventional organtin stabilizers. Comparison of Samples 1 and 2 further reveals that the combination of pentaerythritol monostearate with a minor amount of an organophosphite is superior to the former alone.

EXAMPLE XIII

The effects of pentaerythritol monostearate in combination with a variety of organic phosphite, thiophosphite, and thioglycolyl phosphite esters were investigated by conducting yellowness and brightness tests using compositions containing bulk phase polypropylene, 0.25 wt.% pentaerythritol monostearate, 0.05 wt.% calcium hydroxide, 0.15 wt.% calcium stearate, 0.15 wt.% Goodrite 3114, 0.45 wt.% distearylthiodipropionate, 0.15 wt.% cyclic neopentanetetrayl-bis-(octadecyl) phosphite, and 0.05 wt.% of the additional additives specified below. Results were as follows:

| Sample | Additional Additive | Yellowness (%) | Brightness (%) |
|---|---|---|---|
| 1 | phenyl didecyl phosphite | 6.5 | 65.9 |
| 2 | diphenyl isodecyl phosphite | 5.8 | 66.2 |
| 3 | diphenyl isooctyl phosphite | 5.1 | 66.4 |
| 4 | dioctyl phosphite | 5.3 | 66.0 |
| 5 | trilauryl trithiophosphite | 5.1 | 66.4 |
| 6 | triisooctyltrithioglycolyl phosphite | 4.7 | 66.3 |

We claim:

1. A stabilized composition comprising a highly crystalline polyolefin selected from the group consisting of polybutene-1, poly-4-methylpentene-1, polypropylene, polyethylene, and copolymers of propylene or ethylene with at least one other $C_2$ to $C_8$ terminal olefin, said polyolefin prepared by an essentially solvent-free, anionically catalyzed polymerization process wherein catalyst residues and low molecular weight and amorphous components are incompletely separated from the highly crystalline polyolefin; and a stabilizing amount of a partially esterified polyhydroxyl compound of the formula $(HOCH_2)_m C (CH_2OZ)_{4-m}$, wherein Z is H or COR, at least one Z is COR, m runs from 1 to 3, and R is an aliphatic group containing from about 8 to about 20 carbon atoms.

2. The composition of claim 1 wherein said compound is a monoester of pentaerythritol.

3. The composition of claim 2 wherein said compound is a monostearate, monolaurate, monopalmitate or monooleate ester of pentaerythritol.

4. The composition of claim 3 wherein said polyolefin is selected from the group consisting of polypropylene and copolymers of propylene and at least one other $C_2$ to $C_8$ terminal olefin.

5. The composition of claim 1 wherein said polyolefin is polypropylene and said compound is pentaerythritol monostearate.

6. A stabilized composition comprising:
(a) a highly crystalline polyolefin selected from the group consisting of polybutene-1, poly-4-methylpentene-1, polypropylene, polyethylene, and copolymers of propylene or ethylene with at least one other $C_2$ to $C_8$ terminal olefin, said polyolefin prepared by an essentially solvent-free, anionically catalyzed polymerization process wherein catalyst residues and low molecular weight and amorphous components are incompletely separated from the highly crystalline polyolefin;
(b) a stabilizing amount of a partially esterified polyhydroxyl compound of the formula $(HOCH_2)_m C(CH_2OZ)_{4-m}$ wherein Z is H or COR, at least one Z is COR, m runs from 1 to 3, and R is an aliphatic group containing from about 8 to about 20 carbon atoms; and
(c) at least one organophosphorus compound of the formula $P(AR')_3$, wherein A is —O—, —S—, or —SCH$_2$COO—, and R' is hydrogen or a hydrocarbyl radical selected from the group consisting of aryl, alkylaryl, and aliphatic groups having from about 8 to about 20 carbon atoms, at least one R' being a hydrocarbyl radical.

7. The composition of claim 6 wherein the stabilizing amount of (b) ranges from about 0.01 to about 1 wt.% of the composition and the stabilizing amount of (c) ranges from about 0.01 to about 1 wt.% of the composition.

8. The composition of claim 7 wherein the (c) component is at least one trihydrocarbyl phosphite, trihydrocarbyl trithiophosphite, or trihydrocarbyltrithioglycolyl phosphite.

9. The composition of claim 8 wherein the (b) component is a monostearate, monolaurate, monopalmitate, or monooleate ester of pentaerythritol.

10. The composition of claim 9 wherein the highly crystalline polyolefin is polypropylene or a copolymer of propylene and another $C_2$ to $C_8$ terminal olefin.

11. The composition of claim 10 wherein the (b) component is pentaerythritol monostearate and the (c) component is selected from the group consisting of diphenyl isooctyl phosphite, trilauryl trithiophosphite, triisooctyltrithioglycolyl phosphite, tris(nonylphenyl) phosphite, and mixtures thereof.

12. The composition of claim 11 wherein the (c) component is diphenyl isooctyl phosphite.

13. The composition of claim 11 wherein the (c) component is trilauryl trithiophosphite.

14. The composition of claim 11 wherein the (c) component is triisooctyltrithioglycolyl phosphite.

15. The composition of claim 11 wherein the (c) component is tris(nonylphenyl) phosphite.

16. A process for preparing a stabilized composition comprising
(a) contacting olefin monomer selected from the group consisting of butene-1, 4-methylpentene-1, propylene, ethylene, or a mixture of propylene or ethylene with at least one other $C_2$ to $C_8$ terminal olefin with an anionic catalyst system under essentially solvent-free polymerization conditions to form a product comprising highly crystalline polyolefin, low molecular weight and amorphous components, and anionic catalyst residues; and
(b) incorporating into said product a stabilizing amount of a partially esterified polyhydroxyl compound of the formula $(HOCH_2)_m C(CH_2OZ)_{4-m}$ wherein Z is H or COR, at least one Z is COR, m runs from 1 to 3, and R is an aliphatic group containing from about 8 to about 20 carbon atoms.

17. The process of claim 16 wherein said partially esterified polyhydroxyl compound is a monoester of pentaerythritol.

18. The process of claim 17 wherein the monoester of pentaerythritol is a monostearate, monolaurate, monopalmitate, or monooleate ester of pentaerythritol.

19. The process of claim 18 wherein the olefin monomer is propylene or a mixture of propylene with another $C_2$ to $C_8$ terminal olefin.

20. The process of claim 16 further comprising incorporating into said product a stabilizing amount of at least one organophosphorus compound of the formula $P(AR')_3$ wherein A is —O—, —S—, or —SCH$_2$COO—, and R' is hydrogen or a hydrocarbyl radical selected from the group consisting of aryl, alkaryl, and aliphatic groups having from about 8 to about 20 carbon atoms, at least one R' being a hydrocarbyl radical.

21. The process of claim 20 wherein the organophosphorus compound is at least one trihydrocarbyl phosphite, trihydrocarbyl trithiophosphite, or trihydrocarbyl trithioglycolylphosphite.

22. The process of claim 21 wherein the partially esterified polyhydroxyl compound is a monoester of pentaerythritol.

23. The process of claim 22 wherein the monoester of pentaerythritol is a monostearate, monolaurate, monopalmitate, or monooleate ester of pentaerythritol.

24. The process of claim 23 wherein the olefin monomer is propylene or a mixture of propylene with another $C_2$ to $C_8$ terminal olefin.

25. The process of claim 16 wherein said essentially solvent-free polymerization conditions are bulk phase polymerization conditions.

26. The process of claim 16 wherein said essentially solvent-free polymerization conditions are vapor phase polymerization conditions.

* * * * *

UNITED STATES PATENT OFFICE
CERTIFICATE OF CORRECTION

Patent No. 4,184,987           Dated JANUARY 22, 1980

Inventor(s) NICHOLAS M. KARAYANNIS, HABET M. KHELGHATIAN, AND JOHN S. SKRYANTZ

It is certified that error appears in the above-identified patent and that said Letters Patent are hereby corrected as shown below:

| Col. | Line | PATENT READS: | SHOULD READ: |
|---|---|---|---|
| 1 | 67 | "stabiizers" | --stabilizers-- |
| 2 | 36 | "from" | --form-- |
| 4 | 3 | "trithioglycoly-" | --trithioglycolyl- -- |
| 5 | 4 | "connections" | --connection-- |
| 5 | 62 | "tris(nonlphenyl)" | --tris(nonylphenyl)-- |
| 7 | 32 | "0.5% OTM" | --0.05% OTM-- |
| 8 | 47 | "OTM st. syst. B***" | --st. syst. B***-- |
| 8 | 57 | "1OTM" (#(15)) | --OTM-- |
| 8 | 68 | "phase of polypropylene" | --phase polypropylene-- |
| 10 | 30 | "(wt. %" | --(wt. %)-- |

Signed and Sealed this

Tenth Day of June 1980

[SEAL]

Attest:

SIDNEY A. DIAMOND

Attesting Officer      Commissioner of Patents and Trademarks